United States Patent
Keinath et al.

[11] 3,735,959
[45] May 29, 1973

[54] APPARATUS FOR DISAGGLOMERATING MATERIAL

[75] Inventors: Hans Keinath, Frankfurt (Main); Klaus Kroger, Offenbach (Main); Robert Lauerbach-Lehmeier, Frankfurt (Main), all of Germany

[73] Assignee: Zimmer Aktiengesellschaft, Frankfurt (Main), Germany

[22] Filed: Oct. 13, 1970

[21] Appl. No.: 80,264

[52] U.S. Cl. ..........................259/7, 241/246, 259/9
[51] Int. Cl. ..........................B01f 7/00, B02c 23/02
[58] Field of Search..........................259/7, 8, 9, 10, 259/DIG. 30, 45, 46, 191, 192, 193; 241/244, 245, 246, 247; 146/300

[56] References Cited

UNITED STATES PATENTS

| | | | |
|---|---|---|---|
| 2,573,440 | 10/1951 | Henning | 259/7 X |
| 2,754,542 | 7/1956 | Henning et al. | 259/9 X |
| 2,607,077 | 7/1952 | Dulmage | 107/14 R X |
| 2,894,280 | 7/1959 | Juve | 259/9 X |
| 2,946,089 | 7/1960 | Heston | 259/191 |

FOREIGN PATENTS OR APPLICATIONS

931,590  7/1963  Great Britain..........................259/9

*Primary Examiner*—Robert W. Jenkins
*Assistant Examiner*—Alan I. Cantor
*Attorney*—Molinare, Allegretti, Newitt & Witcoff

[57] ABSTRACT

Apparatus for disagglomerating pigment in fiber-forming resinous material having a body member containing a cylindrical bore and an inlet and outlet passage for passing said material axially through the apparatus; a rotor mounted within said bore having a polygonal cross section. The ridges of the polygonal rotor are rounded and slightly spaced from the bore. The material is subjected to shearing forces to effect disagglomeration as it moves circumferentially between the ridges and the surface of the bore.

4 Claims, 5 Drawing Figures

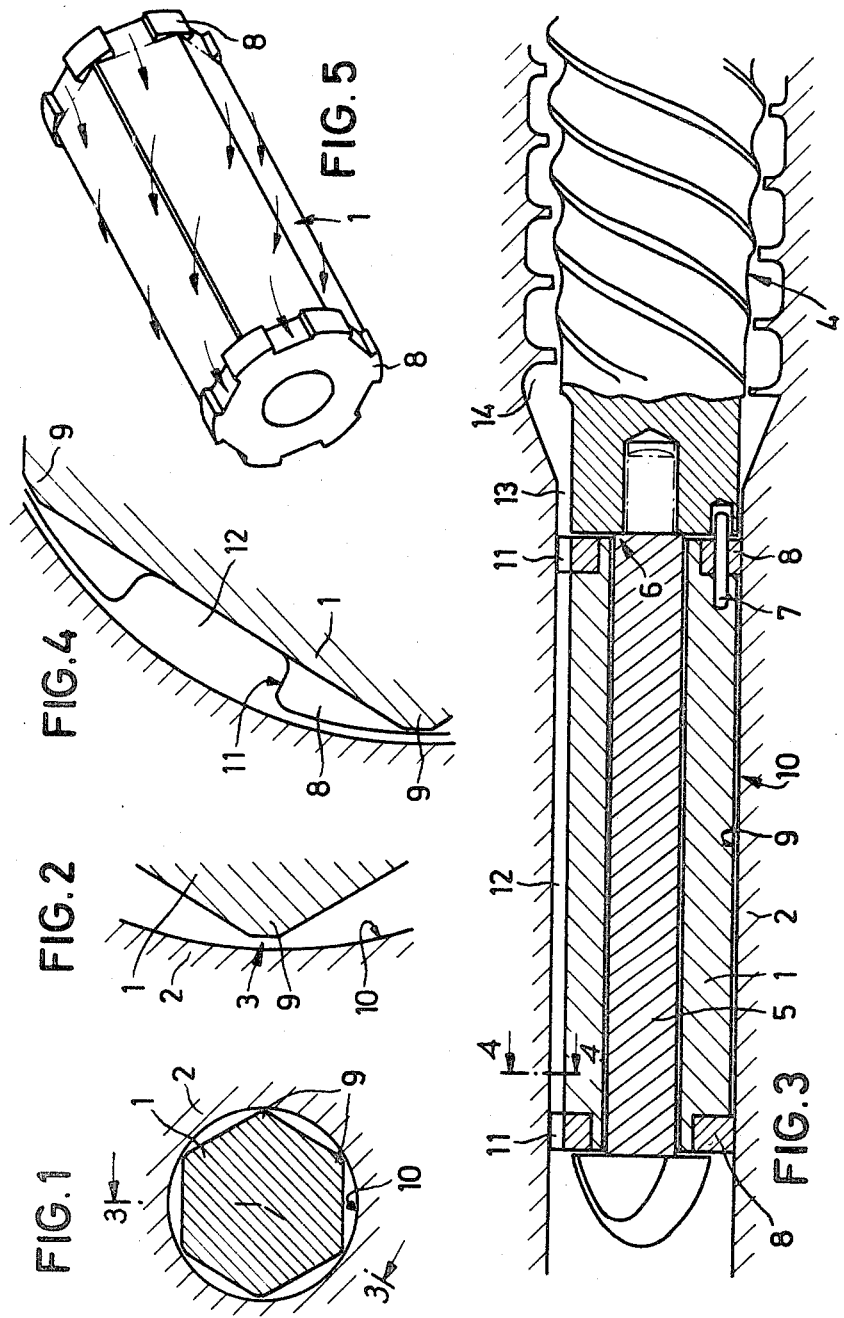
HANS KEINATH, KLAUS KROGER &
ROBERT LAUERBACH-LEHMEIER INVENTORS

APPARATUS FOR DISAGGLOMERATING MATERIAL

BACKGROUND OF THE INVENTION

This invention relates to apparatus for disagglomerating material.

In the production of certain man-made fibers, bulk plastics material is forced under pressure through a fine orifice, the fine filament so extruded being drawn-out under tension (for example, by being wound onto a rotating drum) whereby the ductility of the material results in a much finer filament, several of which may be spun together to form a thread suitable for weaving.

The natural color of the basic material may be modified for decorative purposes by the introduction of suitable additives; titanium dioxide being used for this purpose as an additive to a polyester base to produce a white filament.

A particular problem in the use of titanium dioxide, which is employed in fine powder condition, is that particles of the powder tend to agglomerate, thereby forming local discontinuities within the base material which, when extruded and drawn-out, may occupy a significant proportion of the cross-sectional area of the filament. These discontinuities of the filament constitute regions of relative weakness which may lead to tensile failure of the filament during extrusion. Since many filaments may be extruded simultaneously using a multi-orificed die, the breaking of a single filament results in a disruptive interruption in production.

According to the present invention, there is provided apparatus for disagglomerating material, the apparatus comprising a first member having a cylindrical bore, an inlet at one end for material to be disagglomerated and a material outlet at the other end, and a second member disposed within said bore such that a plurality of peripheral ridges each extending substantially axially of one of the members are disposed closely adjacent the adjacent surface of the other member; one of the members being mounted so as to be rotatable with respect to the other and the arrangement being such that in use of the apparatus with such rotation being effected and with material to be disagglomerated being fed into said inlet to pass along said bore to said outlet, all material so caused to pass along said bore is crossed by at least one of said ridges thereby to be subjected to disagglomerating action.

DETAILED DESCRIPTION OF THE DRAWING

For a better understanding of the invention and to show how the same may be carried into effect, reference will now be made, by way of example, to the accompanying drawing in which:

FIG. 1 is a cross-sectional view of apparatus for disagglomerating material,

FIG. 2 is a cross-sectional view of part of the apparatus of FIG. 1, shown on an enlarged scale, FIG. 3 is a sectional view, taken on the line 3—3 of FIG. 1, FIG. 4 is a sectional view, taken on the line 4—4 of FIG. 3 and on an enlarged scale, and FIG. 5 is a diagrammatic perspective view of part of the apparatus of FIG. 1 and illustrating how the apparatus operates.

DESCRIPTION OF THE PREFERRED EMBODIMENT

Referring to FIG. 1, the apparatus includes a rotor 1 and a stator 2. The stator 2 has a cylindrical bore 10 extending therethrough and the rotor 1 is disposed in this bore for rotation about the axis of the bore. One end of the bore 10 constitutes an inlet for material and the other end constitutes an outlet for this material. The rotor 1 is of constant, substantially hexagonal, cross-section, the ridges 9 between the plane faces of the rotor 1 being cylindrically ground to form lands 3 as will be seen from FIG. 2, and the diameter of the rotor from ridge 9 to opposed ridge 9 being such that there is formed a circumferential region between each land 3 and the curved surface of the bore 10. It will be noted that each ridge 9 extends axially of the rotor 1 and is so arranged that it is closely adjacent the curved surface of the bore 10 throughout the length of each ridge 9.

The apparatus just described may conveniently be mounted at the outlet of a screw feed extruder whereby the rotor 1 of the apparatus may be driven by the rotor of the screw feed extruder. The outlet end 14 of a screw mixer-extruder of the type just mentioned is shown in FIG. 3 with the stator 2 of the present apparatus fast with the stator of the mixer-intruder to form a continuation thereof, and with the rotor 1 of the present apparatus, disposed within the stator 2, supported at the outlet end 14 by the rotor 4 of the mixer-extruder. The rotor 1 is so supported by a stepped bolt 5 screwed into a tapped bore in the rotor 4 such that, when the bolt is tight, and the step or shoulder 6 of the bolt is in engagement with a corresponding face of the rotor 4, the rotor 1 is free for small axial and radial movement whereby it can accommodate any malalignment between the axes of the rotor 4 and the stator 2. Rotational drive is transmitted to the rotor 1 from the rotor 4 via pins 7. The rotor 1 has a locating collar 8 at each end, the circumscribing diameters of each of which is greater than that of the ridges 9 of the rotor 1, but less than the diameter of the bore 10 of the stator 2, such that the locating collars serve to prevent the ridges 9 coming into contact with the curved surface of the bore 10. Recesses 11 formed in the perimeter of the collars 8 as shown in FIG. 4 constitute apertures whereby, in operation, material may pass into and from each region 12 that is defined by the stator 2 and the rotor 1 and a pair of adjacent ridges 9. It will be seen from FIG. 3 that recesses 13 are formed in the end of the rotor 4 which facilitate the feeding of material, issuing from the outlet end 14 of the rotor 4, to the corresponding recesses 11 of the adjacent collar 8.

In use of the apparatus when co-operating with a screw extruder as shown in FIG. 3, the rotor 1 is rotated and the material to be disagglomerated is supplied under pressure at the inlet end of the rotor 1, the material tending to pass along the regions 12 to emerge at the outlet end of the rotor 1. As the ridges 9 move circumferentially past the surface of the bore 10 during rotation, material in the region 12 preceding each ridge 9 is progressively transferred by viscous shear movements across the ridge 9 and into the region 12 succeeding this ridge 9. These intense viscous shear movements of the material cause disagglomeration of particles carried in the material, owing to the close proximity of the ridge 9 to the surface of the bore 10.

The length and number of ridges 9 on the rotor 1 and the shape of the surface between adjacent ridges 9 is arranged such that all the material entering at the inlet end of the rotor 1 passes across at least one ridge 9 before emerging at the outlet end of the rotor 1.

It will be appreciated that the lands 3 of the rotor 1 facilitate a more prolonged period of intense viscous shear than would be the case if these edges were sharply defined edges of a hexagon.

FIG. 5 illustrates the flow as just described of material relative to the rotor 1 when the rotor 1 is rotated within the stator 2, the flow being illustrated by arrows in this figure. It will be seen that the material entering between a pair of adjacent ridges 9 crosses at least one of the ridges 9 before discharge.

Although the physical characteristics required to insure that material entering at one end of the stator 2 crosses at least one ridge 9 of the rotor 1, before leaving at the other end, are likely to vary with the rheological properties of the material to be disagglomerated, apparatus having the following dimensions has been found to operate satisfactorily to disagglomerate titanium oxide in polyester base:

| | |
|---|---|
| Working length of the rotor | =9.84" |
| Diameter of bore of stator | =2.2835"-2.2837" |
| Outside diameter of rotor collar | =2.2799"-2.2803" |
| Diameter across ridges of rotor | =2.2792"-2.2796" |
| Width of cylindrical ground portions of ridges | = .0063"- .0070" | but it will be appreciated that using apparatus having other dimensions will facilitate disagglomeration of other materials.

Although the rotor 1 has been described hereinabove as having ridges 9 which extend axially of the rotor 1, it would be possible to provide ridges 9 having a helical form of large pitch about the body of the rotor 1, such ridges still being, in effect, substantially axial of the rotor.

We claim:

1. Apparatus for disagglomerating material, comprising a first member having a cylindrical bore, an inlet at one end for material to be disagglomerated and a material outlet at the other end, and a second member disposed within said bore such that a plurality of peripheral ridges each extending substantially axially of one of the members are disposed closely adjacent the adjacent surface of the other member; one of the members being mounted so as to be rotatable with respect to the other, whereby material caused to pass along said bore is crossed by at least one of said ridges thereby to be subjected to disagglomerating action, said apparatus is adapted for mounting at the outlet end of a screw feed extruder, said first member, when the apparatus is so mounted, extending from the outlet end of the stator of the extruder to form a continuation thereof, and said second member being movably secured to the rotor of the extruder to be rotated thereby, said second member is polyganol in cross section, the junctions between the plane faces thereof constituting said ridges, said second member located within said bore by a locating collar, the circumscribing diameter of which is greater than that of said ridges, and means for movably securing said second member to said rotor to allow small axial and radial movements for accommodating axial misalignment between the axes of said first member and said rotor of the extruder.

2. Apparatus of claim 1, wherein said ridges are cylindrically ground.

3. Apparatus of claim 1, wherein said collar is between said inlet and said outlet, and wherein apertures are provided in said collar to permit passage of material from said inlet to said outlet.

4. Apparatus of claim 1, wherein said second member is mounted on the larger diameter portion of a stepped bolt, the smaller diameter portion of which is threaded for engagement with a correspondingly tapped bore in said rotor.

* * * * *